J. F. O'CONNOR.
FRICTION DRAFT RIGGING FOR RAILWAY CARS.
APPLICATION FILED MAY 8, 1907.
1,077,366.
Patented Nov. 4, 1913.
2 SHEETS—SHEET 2.
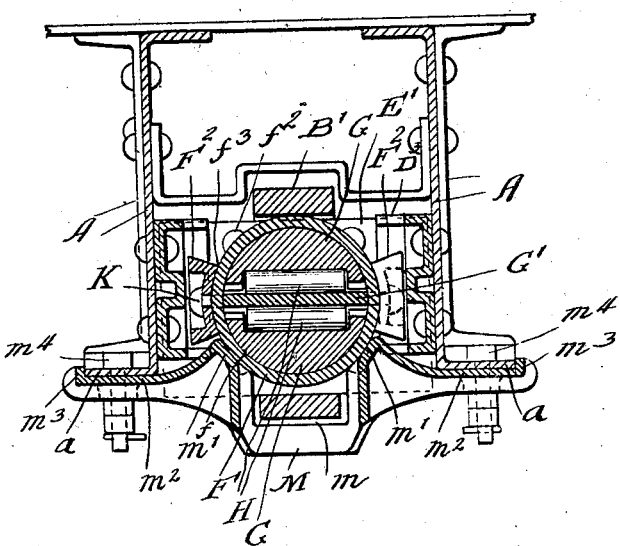
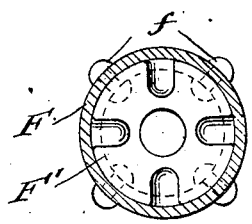
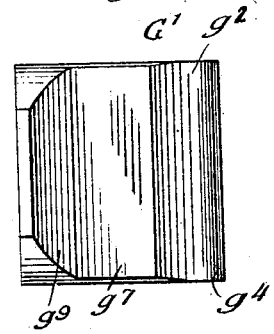
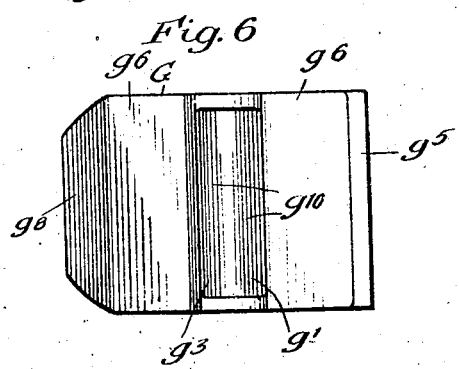
Witnesses:
Wm. Geiger
H. W. Munday
Inventor:
John F. O'Connor
By Munday, Evarts, Adcock & Clarke
Attorneys.

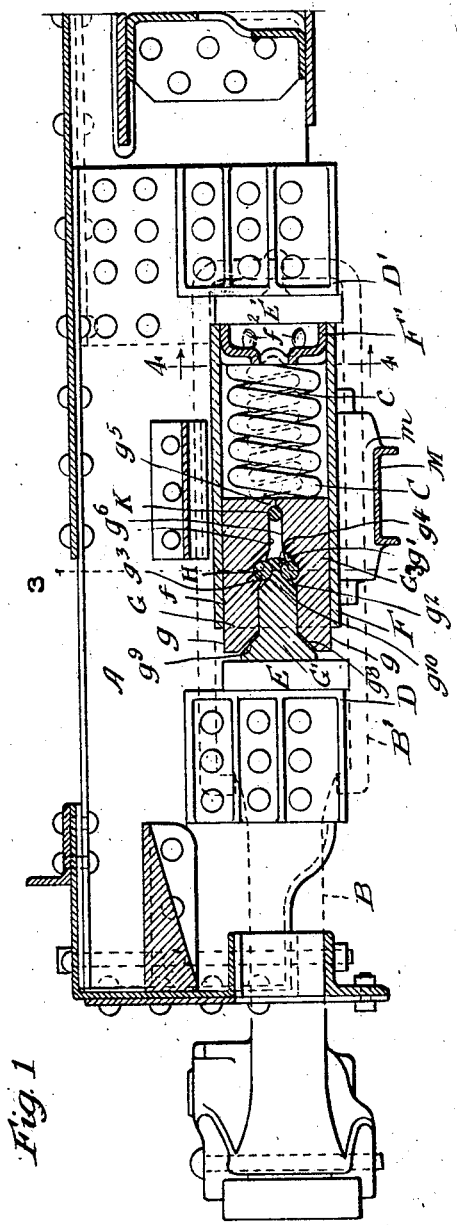
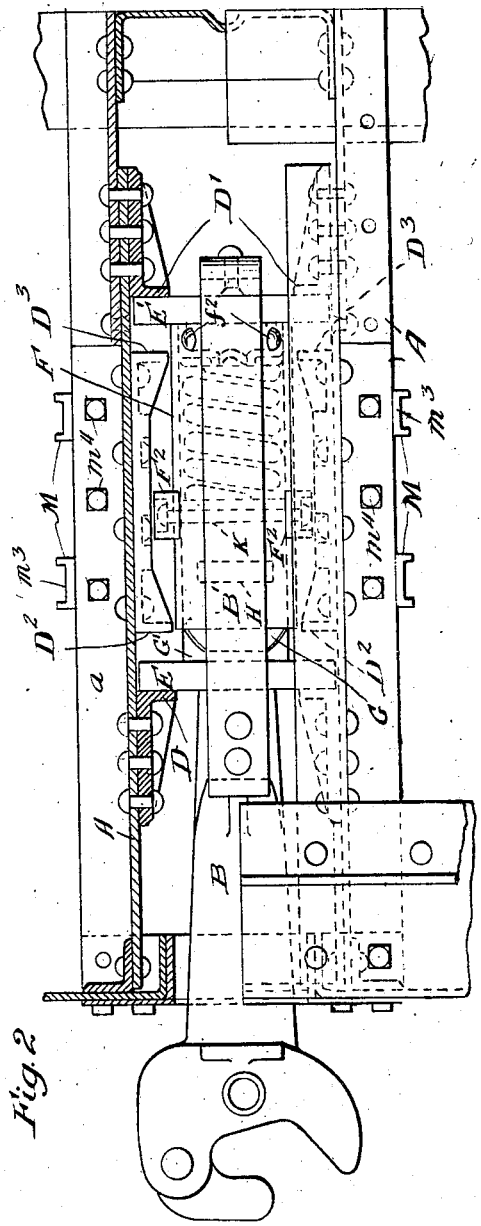

UNITED STATES PATENT OFFICE.

JOHN F. O'CONNOR, OF CHICAGO, ILLINOIS, ASSIGNOR, BY MESNE ASSIGNMENTS, TO WILLIAM H. MINER, OF CHICAGO, ILLINOIS.

FRICTION DRAFT-RIGGING FOR RAILWAY-CARS.

1,077,366.  Specification of Letters Patent.  Patented Nov. 4, 1913.

Application filed May 8, 1907. Serial No. 372,597.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging for Railway-Cars, of which the following is a specification.

My invention relates to friction draft rigging for railway cars.

The object of my invention is to provide a draft rigging of a simple, strong, safe, efficient and durable construction, having both a direct acting spring cushioning member longitudinally arranged in the line of the draw-bar, and also frictional cushioning devices with longitudinally extending friction faces parallel to the draw-bar, and co-operating with the direct acting longitudinally arranged spring, (the same comprising a longitudinally movable friction shell, sliding friction blocks within the shell and a wedge between the friction blocks) and by which the objections heretofore experienced from the wedge and friction devices sticking and acting with uncertainty and irregularity, and thus reducing the effective cushioning action of the friction devices, may be practically overcome, and also by which the tendency of the friction shell, which incloses the friction blocks and the spring, to become shortened under blows or hammering action of the draw-bar may also be entirely obviated, and wherein also the wedge, friction blocks and spring may all be held permanently assembled within the friction shell.

My invention consists in the means I employ to practically accomplish this object or result. That is to say, it consists in connection with the draw-bar and its yoke, front and rear stops, front and rear followers, a direct acting longitudinally arranged spring, a longitudinally movable friction shell fitting within the draw-bar yoke and having a longitudinally extending interior friction face, a plurality of coöperating friction blocks having longitudinally extending exterior friction faces in sliding frictional engagement with the interior friction face of said shell and arranged in the line of the draw-bar, and engaging at one end of the longitudinally arranged direct acting spring, a wedge between said friction blocks and co-operating with the wedging faces thereof and interposed between the draw-bar and the friction blocks, anti-friction rollers interposed between the inclined faces of the wedge and the inclined faces of the friction blocks, the wedge and friction blocks having coöperating shoulders to keep the anti-friction rollers in place, and the rollers having a rolling action on both the wedge and friction blocks, a pin or rivet extending diametrically through the friction shell and engaging the shoulders on the friction blocks to hold the friction blocks within the shell, the coöperating shoulders on the wedge and the friction blocks which engage the anti-friction rollers serving to hold the wedge within the shell, and the friction shell being provided at its end with a head to close the same and confine the spring within the shell in its assembled position, and intermediate stops on the car frame adapted to engage the followers and limit their movement, and thus preventing the blows or hammering action of the draw-bar from tending to shorten the friction shell or to compress the spring solid.

It further consists in connection with these parts, of guides secured to the friction shell which are preferably of cylindrical form to keep the same laterally in position, said guides being secured to the shell preferably by the rivet which extends through the same to hold the friction blocks in place within the shell.

My invention further consists in the novel construction of parts and devices, and in the novel combinations of parts and devices herein shown and described.

In the accompanying drawing forming a part of this specification, Figure 1 is a central vertical longitudinal section of a direct acting friction spring draft rigging embodying my invention. Fig. 2 is a plan view partly in horizontal section. Fig. 3 is a cross section on line 3—3 of Fig. 1. Fig. 4 is a section on line 4—4 of Fig. 1. Figs. 5 and 6 are detail plan views of the wedge and friction block.

In the drawing, A represents the center sills or other frame pieces of the car to which the draft rigging is applied. B is the draw-bar, B¹ its yoke, C a longitudinally arranged direct acting draft rigging spring, c a smaller spring which is preferably employed within the spring C, D D¹ front and rear stops, D² D³ intermediate stops, E E¹ front and rear followers.

F is the longitudinally movable friction shell, preferably cylindrical in form, having an interior longitudinally extending friction face $f$.

G G are longitudinally movable friction blocks within the shell F and having longitudinally extending exterior friction faces $g$ $g$ in sliding frictional engagement with the interior friction face of the friction shell F.

G¹ is the wedge between the friction blocks G G. The friction blocks G have inclined or wedging faces $g^1$ which coöperate with the corresponding inclined or wedging faces $g^2$ of the wedge G¹ and the interposed friction rollers H which have a rolling contact on the wedging faces $g^1$ $g^2$ of both the friction blocks G G and the wedge G¹ to prevent any tendency of the wedges and friction blocks from sticking. The friction blocks G G are also furnished with curved shoulders $g^3$ which coöperate with corresponding shoulders $g^4$ on the wedge G¹ to hold or keep the anti-friction rollers H H in place while permitting the same to roll freely on the inclined or wedging faces $g^1$ $g^2$ of the friction blocks G and wedge G¹. The friction blocks G are further provided with retaining shoulders $g^5$, which engage a transversely extending pin or rivet K secured to the friction shell F and adapted to engage said shoulders $g^5$ on the friction blocks G when the spring C is expanded to its full extent, thus preventing the friction blocks G from being entirely removed from the friction shell F.

The coöperating shoulders $g^4$ on the wedge G¹ which engage the anti-friction rollers H in connection with the roller engaging shoulders $g^3$ on the friction blocks also hold the wedge G¹ in its assembled position within the shell F. The friction blocks G and wedge G¹ are also preferably furnished with longitudinal parallel faces $g^6$ $g^7$ and tapering faces $g^8$ $g^9$. To keep the spring C and spring $c$ in their assembled position within the shell F, said shell is provided with a head F¹ closing the same, preferably of a cap shape, and secured in place by rivets $f^2$ after the wedge G¹, friction blocks G G, anti-friction rollers H H and springs C $c$ have been inserted within the shell F.

To keep the shell F from turning and to guide it laterally and maintain it in its true central position in the line of draft, it is provided with external guides F² F². one on each side, the inner face $f^3$ of which is curved to fit the shell F, and which are preferably secured to the shell by the pin or rivet K which extends diametrically through the shell. These shell guides F² fit against the inner faces of the intermediate stop castings D² D³, the stops D² D³ being preferably made in one piece or casting. In the drawing, I have illustrated the front and rear stops D D¹ in separate pieces from the intermediate stops D² D³, but all these stops or abutment shoulders may be made in one stop casting, if preferred. The friction blocks G preferably have chilled or hardened portions $g^{10}$ extending preferably to the depth of a quarter inch or such matter from the friction faces and wearing portions of the friction blocks. As each friction block G has only one stop or roller engaging shoulder for the anti-friction roller H, the roller is thus free to turn with a rolling action or movement on the friction block; and as the coöperating wedge block G¹ also has on each of its inclined or wedging faces only one stop shoulder for the roller H to engage, it leaves the rollers free to turn with a rolling movement on the inclined or wedging faces of the wedge also. The rollers H H thus have a true rolling or anti-friction action in coöperation with the wedge and friction blocks, and thus cause the friction devices to act with certainty and efficiency and reliability and without danger of sticking, and as in my improved friction draft rigging, intermediate stops are provided to limit the movement of the followers and the operation of the springs independent of the longitudinally movable friction shell F, this friction shell is entirely relieved and protected from the blows of the draw-bar and prevented from being upset, compressed or shortened in length thereby.

M is the lower tie or guide plate which supports and guides the friction shell as well as the draw-bar extension or yoke B¹ and the draft rigging as a whole. This tie or guide plate is preferably furnished with a central longitudinal channel $m$ to receive the lower limb or member of the draw-bar yoke, and with concavely curved guide faces $m^1$ to receive, feed and guide the friction shell F. The tie-plate M also has wings or flanges $m^2$ provided with shoulders $m^3$ to engage the lower flanges $a$ of the center sills or other stationary parts to which the guide or tie plate M is secured by its bolts $m^4$.

The wedge faces or inclines $g^1$ on the friction blocks and $g^2$ $g^2$ on the wedge block G¹ are preferably at angles of about forty-five degrees.

As in my invention the wedge G¹ has an antifriction roller on each face thereof interposed between it and the adjacent friction blocks G, the wedge G¹ has no frictional engagement with either of the friction blocks or other parts, and thus is entirely free to retract or release the moment the pressure of the draw bar thereon is removed, the wedge G¹ thus being to all intents and purposes an antifriction wedge.

I claim:—

1. In a friction draft rigging, the combination with the draw-bar, yoke, followers, front and rear stops for the followers, of a longitudinally movable friction shell, longitudinally movable friction blocks inside said shell, a wedge block between said friction blocks, a longitudinally arranged spring acting at one end against said friction blocks and at its other end against said friction shell, and a pin extending through said friction shell normally in engagement with said friction blocks, said friction blocks having retaining shoulders normally engaging said pin and arranged to prevent the spring from forcing the friction blocks out of the casing, substantially as specified.

2. In a friction draft rigging, the combination with the draw-bar, yoke, followers, front and rear stops for the followers, of a longitudinally movable friction shell, longitudinally movable friction blocks inside said shell, a wedge block between said friction blocks, a longitudinally arranged spring acting at one end against said friction blocks and at its other end against said friction shell, a pin extending through said friction shell normally in engagement with said friction blocks, said friction blocks having retaining shoulders normally engaging said pin and arranged to prevent the spring from forcing the friction blocks out of the casing, and guides on the exterior of said shell located centrally, vertically thereof on opposite sides, said guides being secured to the shell by said pin, substantially as described.

JOHN F. O'CONNOR.

Witnesses:
 EDMUND ADCOCK,
 PEARL ABRAMS.